United States Patent [19]

Donati et al.

[11] Patent Number: 4,937,518
[45] Date of Patent: Jun. 26, 1990

[54] ELECTRICAL INCLINATION SENSOR AND A MONITORING CIRCUIT FOR THE SENSOR

[75] Inventors: Silvano Donati, Milan; Roberto Dell'Acqua; Giovanni Brunetti, both of Pavia; Giuseppe Dell'Orto, Milan, all of Italy

[73] Assignee: Marelli Autronica S.p.A., Milan, Italy

[21] Appl. No.: 302,271

[22] Filed: Jan. 27, 1989

[30] Foreign Application Priority Data

Jan. 27, 1988 [IT] Italy .................... 67048 A/88

[51] Int. Cl.[5] ............... G01C 17/26; G08C 19/10
[52] U.S. Cl. ................... 324/716; 33/363 N; 33/312; 324/660
[58] Field of Search ............ 33/363 N, 305, 306, 33/312; 73/304 R; 340/870.38; 324/65 P, 65 R, 61 P, 61 R

[56] References Cited

U.S. PATENT DOCUMENTS 3,906,471  9/1975  Shawhan ............... 324/61 R

FOREIGN PATENT DOCUMENTS 0170314  2/1986  European Pat. Off. ....... 33/363 N
0757696  8/1980  U.S.S.R. ..................... 33/312
0558616  1/1944  United Kingdom .......... 33/312

*Primary Examiner*—Reinhard J. Eisenzopf
*Assistant Examiner*—Jose M. Solis
*Attorney, Agent, or Firm*—Sughrue, Mion, Zinn, Macpeak & Seas

[57] ABSTRACT

The sensor comprises a body defining a closed chamber which is partially filled with electrically conductive liquid. A main electrode and first and second auxiliary electrodes extend within the chamber in such a way that a variation in the inclination of the body from a predetermined position causes a corresponding variation in the electrical resistance between each auxiliary electrode and the main electrode. The monitoring circuit for the sensor comprises a generator which applies square-wave signals to the auxiliary electrodes in counterphase, and a detector/amplifier which is synchronized with the generator and samples the signal taken from the main electrode in the sensor.

15 Claims, 4 Drawing Sheets

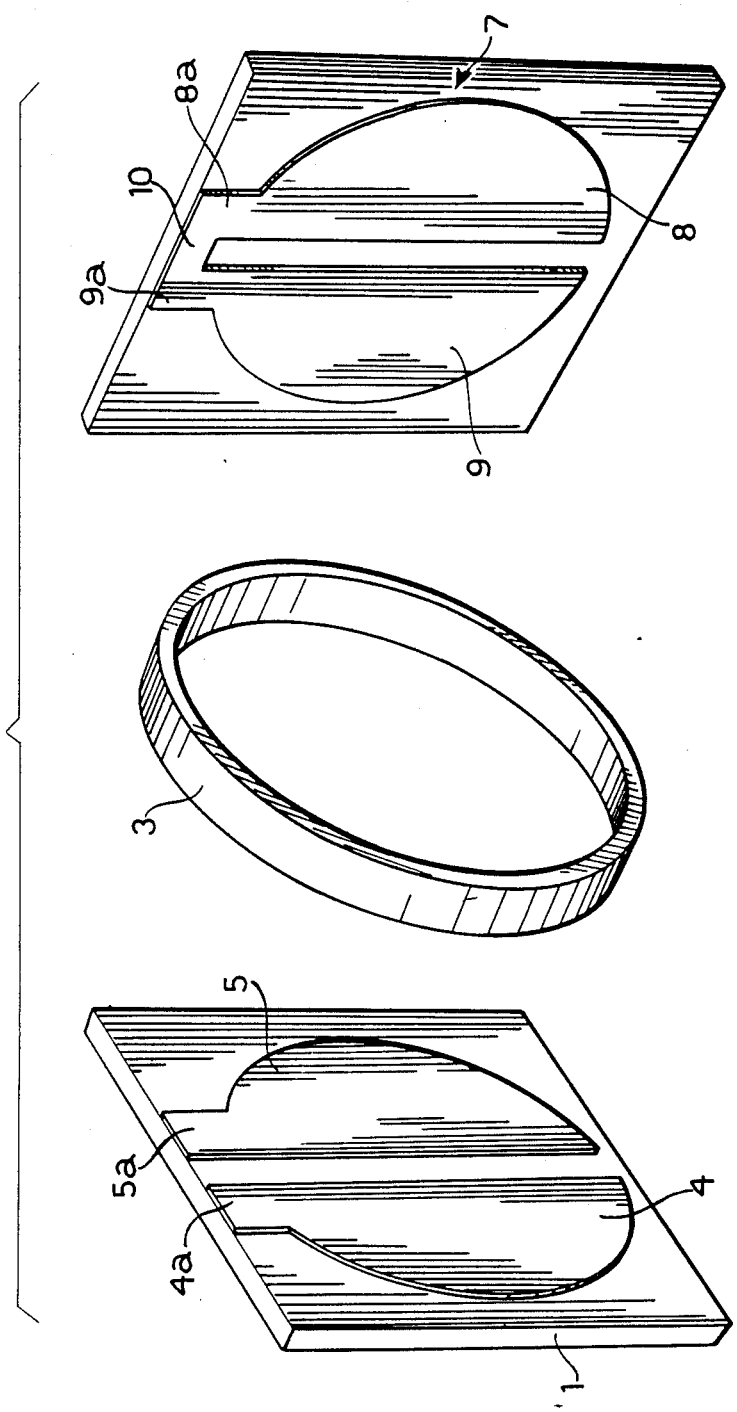

ELECTRICAL INCLINATION SENSOR AND A MONITORING CIRCUIT FOR THE SENSOR

DESCRIPTION

The present invention relates to an electrical inclination sensor comprising a body defining a closed chamber which is partially filled with electrically-conductive liquid and at least one main electrode and first and second auxiliary electrodes which extend within the chamber and are accessible from the outside, in such a manner that a variation in the inclination of the body from a predetermined position causes a corresponding variation in the electrical resistance between each auxiliary electrode and the main electrode.

The inclination sensor according to the present invention is characterised in that the body comprises two support elements of insulating material arranged with respective flat surfaces facing each other, and an annular spacer element connected with a liquid-tight seal between the flat surfaces of the support elements so as to define therewith the cylindrical chamber;

the first and second auxiliary electrodes being constituted by conductive elements fixed adjacent the flat surface of one of the elements of the body;

the main electrode comprising two conductive elements, fixed to the flat surface of the other support element of the body and having a corresponding shape and position to those of the auxiliary electrodes; the conductive elements which form the main electrode being interconnected by an electrically-conductive connection.

According to a further characteristic, the spacer element is circular in shape and the auxiliary electrodes are essentially in the shape of circular segments and are arranged with their respective cordal edges facing each other.

The curved edges of the auxiliary electrodes (and of the elements which form the main electrode) lie on the same imaginary circumference, coaxial with the spacer element.

The liquid used is conveniently methylene diglycol, for example.

The invention also concerns a monitoring circuit for an electrical inclination sensor of the type specified above.

Further characteristics and advantages of the present invention will become clear from the detailed description which follows with reference to the appended drawings, provided by way of non-limiting example:

FIG. 4 is an exploded perspective view of the sensor shown in FIG. 1

Figure 1:
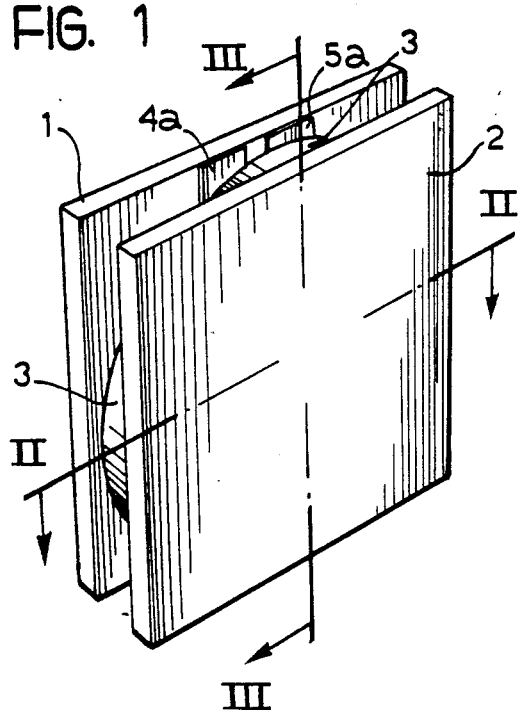
FIG. 1 is a perspective view of an inclination sensor according to the invention.

With reference to FIG. 1, an electrical inclination sensor according to the invention comprises a body formed by two plate-shaped elements 1 and 2 of electrically-insulating material, for example alumina or other ceramic material, arranged facing each other. An annular circular spacer 3, also of electrically-insulating material is fixed between the elements 1 and 2. This spacer is cemented, vitrified or glued to the elements 1 and 2.

As can be seen particularly from FIG. 4, on its surface facing the element 2, the support element 1 has a pair of electrodes 4 and 5, conveniently of metal, for example palladium or an alloy thereof, deposited by a silk-screen printing technique. These electrodes are essentially in the shape of circular segments and are arranged with their respective cordal edges facing each other and with their curved edges lying on the same imaginary circumference. The distance between the electrodes 3 and 5 is preferably substantially equal to the width of the spacer element 3 and hence to the distance between the facing surfaces of the two flat support elements 1 and 2.

The electrodes 4 and 5, which will be referred to below as auxiliary electrodes, each have a respective extension 4a, 5a at one end which projects out of the chamber 6 defined between the elements 1 and 2 and the spacer 3. The extensions are thus accessible from the exterior for connection to external monitoring circuits as can be seen in particular in FIG. 1.

On its surface facing the element 1, the support element 2 carries a main electrode, generally indicated 7, comprising two conductive elements 8 and 9 whose shape and position correspond to those of the electrodes 4 and 5. The conductive elements 8 and 9 also have respective extensions, indicated 8a and 9a, which project from the chamber 6 and are joined together by an integral electrically-conductive connection 10. The main electrode 7 is also conveniently formed, for example, by silk-screen printing.

The imaginary circumferences on which lie the curved edges of the electrodes 4 and 5 and of the parts 8 and 9 of the main electrode 7 are coaxial with the spacer element 3.

Figure 3:
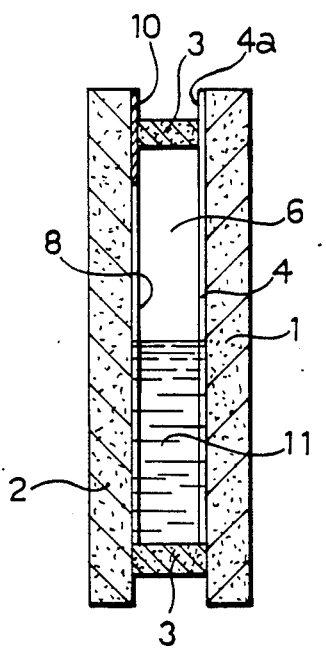
FIG. 3 is a section taken on the line III—III of FIG. 1.
Figure 2:
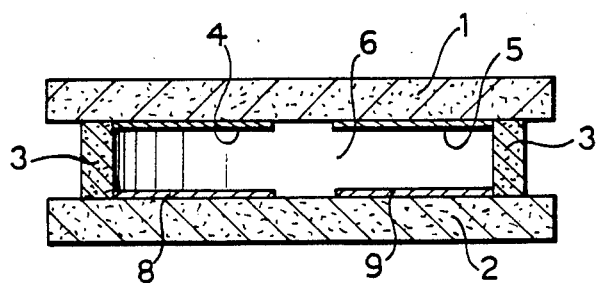
FIG. 2 is a section taken on the line II—II of FIG. 1.
Figure 5:
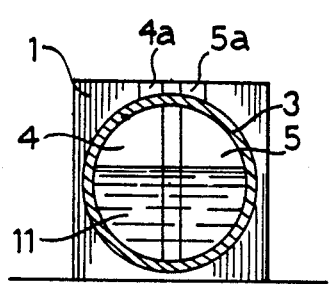
FIGS. 5 and 6 are sections showing the inclination sensor according to the invention in two different conditions of use.
Figure 6:
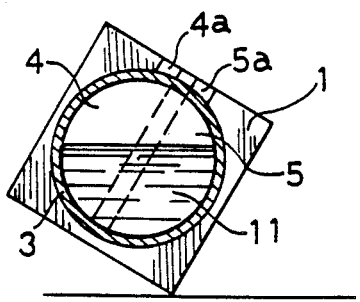

As can be seen in particular from FIGS. 3, 5 and 6, the chamber 6 of the sensor contains a conductive liquid 11 which preferably occupies about half its volume. This liquid is for example, methylene diglycol and it forms a resistive electrical connection between the auxiliary electrodes 4 and 5 and the main electrode 7.

When the sensor described above is arranged in a horizontal plane, as shown in FIG. 5, the electrical resistances between the auxiliary electrodes 4, 5 and the main electrode are the same. If the sensor is inclined so that its lower edge is at an angle to the horizontal, as shown by way of example in FIG. 6, the electrical resistance between one auxiliary electrode and the main electrode increases and the resistance between the other auxiliary electrode and the main electrode decreases correspondingly. These resistance variations are univocally related to the angle of inclination of the sensor and when suitably monitored, enable an indication or measurement of this angle to be provided.

A monitoring circuit which can be used in connection with the sensor described above will be described in detail below.

Figure 7:
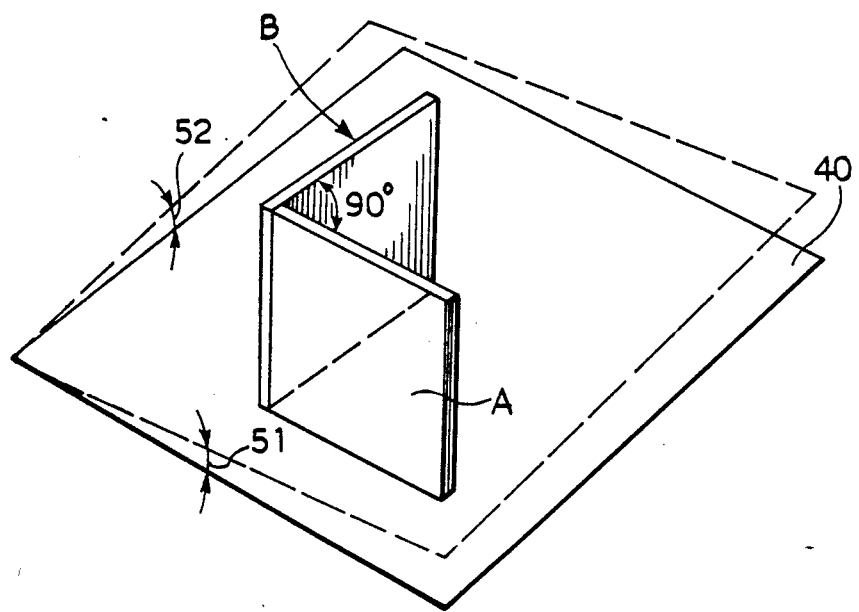
FIG. 7 is a perspective view showing an inclination monitoring device comprising a pair of inclination sensors of the type shown in the preceding Figures.

Two sensors of the type described above may conveniently be interconnected, for example, in the manner shown in FIG. 7 in order to monitor inclination to a horizontal plane. This drawing shows two sensors A and B of the type described above interconnected along a side which is vertical so that the axes of their respective internal chambers are at 90° to each other. The plane defined by the lower supporting edges of the sensors A and B is indicated 40. If this plane is not horizontal, it generally forms two angles, indicated 51 and 52 with a horizontal plane (indicated 41 in FIG. 7). These angles may be detected by means of the cells A and B respectively.

In general, in order to monitor the inclination of a plane to the horizontal, two sensors of the type described above may be used, whose axes intersect preferably at 90°, to each other as in the example of FIG. 7, or are askew.

A monitoring circuit, particularly for use in connection with a pair of sensors of the type described with reference to the preceding drawings, will now be described with reference to FIG. 8. This circuit, moreover, may be used generally in connection with an electrical inclination sensor of the type according to the introduction to claim 1 below.

Figure 8:
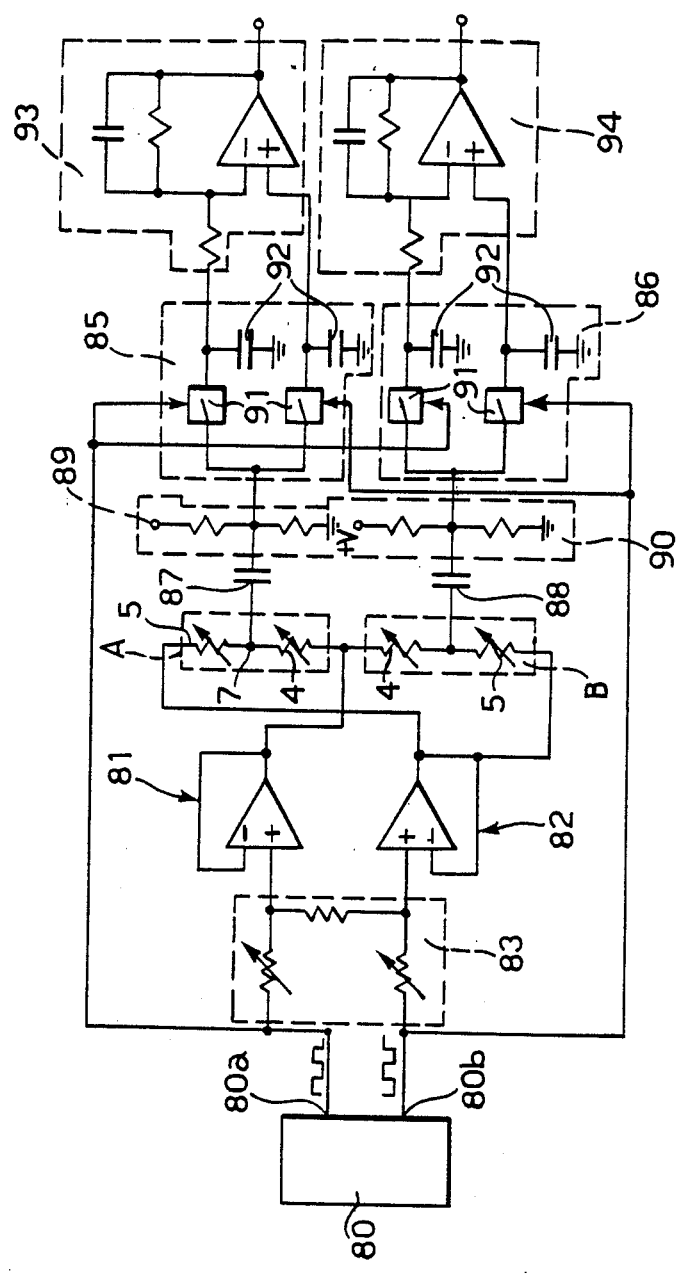
FIG. 8 is a detailed electrical diagram of a monitoring circuit for an electrical inclination sensor.

In FIG. 8, an astable multivibrator indicated 80 is arranged to output square-wave signals in counterphase at two outputs 80a and 80b, with a duty cycle of 50%. The outputs 80a and 80b of the multivibrator are connected to the auxiliary electrodes of two sensors A and B of the type illustrated in FIGS. 1 to 6, through an adjustable resistive attenuator 83 and two decoupling impedance circuits 81 and 82 constituted by "voltage follower" circuits. In the diagram of FIG. 8, variable resistors have been indicated between the auxiliary electrodes 4 and 5 and the main electrode 7 of each sensor A and B: these correspond to the variable resistances which exist in use between the electrodes as the inclination varies.

The main electrodes 7 of the two sensors A and B are connected to the inputs of respective sampling circuits 85 and 86 through decoupling capacitors 87, 88 and resistive dividers 89, 90.

Each sampling circuit 85 or 86 has an input from which branch two circuits each including a controlled switching device 91 connected to a capacitor 92. The two switches 91 of each sampling circuit are connected to the outputs 80a and 80b respectively of the multivibrator 80, so that, in use, they are piloted in counterphase.

The two branch circuits of each sampling circuit are connected to the inverting and non-inverting inputs respectively of a differential amplifier 93 (94), as shown in FIG. 8. The amplifiers 93, 94 have respective reactive feedback networks for low-pass filtering of the signal.

The operation of the part of the circuit of FIG. 8 which relates to the treatment of the signal provided by one of the two sensors will now be described, the operation of the other part of the circuit being exactly the same.

Supposing that the sensor A is arranged horizontally like the sensor shown in FIG. 5. In this situation, as a result of the synchronous sampling carried out in the circuit 85, signals are fed in counterphase to the inverting and non-inverting inputs of the amplifier 93 so that the amplification circuit does not output any signal.

Supposing now that the sensor A is inclined, for example like the sensor shown in FIG. 6. As a result of the variation in the resistances between the electrodes 4 and 5 and the main electrode 7, signals will be fed in counterphase to the inputs of the amplification circuit 93 but their amplitudes will, however, be such that they do not cancel each other out. A signal will thus be output by the amplification circuit with a sign and amplitude indicative of the sign and amplitude of the angle of inclination of the sensor.

Tests carried out by the inventors have shown that the electrical inclination sensor according to the invention is able to operate in an ambient temperature range of from −30° C. to +80° C. with a measurement error of less than ±2%. The sensor according to the invention has also been shown to provide a response which, to a very close approximation, is linear with residual deviation limits (due only to any inaccuracy in the mounting of the elements) which are in any case, less than 1%. The linearity of the response of the sensor is thought to result from the semicircular geometry of the auxiliary electrodes and of the corresponding portions of the main electrode, as well as from the circular cylindrical shape of the sensor chamber.

A further advantage and characteristic of the sensor of the invention lies in the fact that it may be rotated through almost 90° before the liquid it contains can reach the terminals 4a, 5a of the electrodes. The sensor is therefore suitable for monitoring angles of inclination in a range greater than ±60°. It has also been found that, if the sensor is inclined in a plane perpendicular to the usual plane of measurement, the signal it outputs does not vary appreciably.

Naturally, the principle of the invention remaining the same, the forms of embodiment and details of construction may be varied widely with respect to those described and illustrated purely by way of non-limiting example, without thereby departing from the scope of the present invention.

What is claimed is:

1. An electrical inclination sensor comprising
   a body defining a closed chamber which is partially filled with a quantity of electrically-conductive liquid, and
   at least one main electrode and first and second auxiliary electrodes which extend within the chamber and are accessible from the outside, in such a manner that a variation in the inclination of the body from a predetermined position causes a corresponding variation in the electrical resistance between each auxiliary electrode and the main electrode;
   two support elements of insulating material arranged with respective flat surfaces facing each other, and
   an annular spacer connected with a liquid-tight seal between the flat surfaces of the support elements so as to define therewith a cylindrical chamber,
   the first and second auxiliary electrodes being constituted by conductive elements fixed in positions adjacent the flat surface of one of the elements of the body;
   the main electrode comprising two conductive elements fixed to the flat surface of the other support element of the body and having a corresponding shape and position to those of the auxiliary electrodes; the conductive elements which form the main electrode being interconnected by an electrically-conductive connection.

2. A sensor according to claim 1, wherein the spacer is circular in shape and the auxiliary electrodes are essentially in the shape of circular segments and are arranged with their respective cordal edges facing each other.

3. A sensor according to claim 2, wherein the curved edges of the auxiliary electrodes and the curved edges of the elements of the main electrode lie on imaginary circumferences coaxial with the spacer element.

4. A sensor according to claim 3, wherein the separation of the auxiliary electrodes and of the elements of the main electrode is substantially equal to the width of the spacer element and hence to the distance between the facing surfaces of the two flat elements of the body.

5. A sensor according to claim 1, wherein the elements of the body are constituted by plates of electrically-insulating material, particularly ceramic material.

6. A sensor according to claim 1, wherein the electrodes are of metal, particularly palladium or alloys thereof, and are applied to the respective support elements by silk-screen printing.

7. A sensor according to claim 2, wherein the auxiliary electrodes each have a respective extension at one end which projects from the chamber and is accessible at the exterior for connection to electrical/electronic supply and monitoring circuits.

8. A sensor according to claim 7, wherein the two elements of the main electrode have respective extensions at one end which are connected to each other to form a single terminal which projects from the chamber and is accessible at the exterior for connection to the electrical/electronic supply and monitoring circuits.

9. A sensor according to claim 2, wherein the cylindrical chamber is substantially half-full of a conductive liquid.

10. A sensor according to claim 1, wherein the conductive liquid is methylene diglycol.

11. A device for detecting inclination to a horizontal plane, including a pair of sensors according to claim 1, arranged so that the axes of their respective cylindrical chambers are askew or intersect, preferably at 90°, to each other.

12. A monitoring circuit for an electrical monitoring sensor of the type according to claim 1, comprising
a signal generator for applying first and second periodic signals in counterphase with each other to the first and second auxiliary electrodes,
first and second sampling circuits connected to the main electrode and to the generator for sampling the signal from the main electrode in synchronism with the first and second signals, and
differential amplifier means for outputting an electrical signal whose amplitude is indicative of the difference between the signals output by the sampling circuits and hence of the absolute value of the angle of inclination of the sensor and whose sign indicates the sign of the angle of inclination.

13. A circuit according to claim 12, wherein decoupling impedance circuit means, particularly of the "voltage follower" type, are interposed between the signal generator and the auxiliary electrodes of the sensor.

14. A circuit according to claim 12, wherein each sampling circuit includes a capacitor and a switching device for coupling the capacitor to the main electrode, and decoupling it therefrom.

15. A circuit according to claim 12, wherein the amplified means include a differential amplifier provided with a reactive feedback network for low-pass filtering.

* * * * *